(12) United States Patent
Chang et al.

(10) Patent No.: US 9,151,945 B2
(45) Date of Patent: Oct. 6, 2015

(54) MICRO ELECTRIC LIQUID DEVICE AND APPARATUS INCLUDING THE SAME

(71) Applicant: Samsung Electronics Co., Ltd., Suwon-si (KR)

(72) Inventors: Jong-hyeon Chang, Suwon-si (KR); Woon-bae Kim, Seoul (KR); Seung-wan Lee, Suwon-si (KR); Eun-sung Lee, Hwaseong-si (KR); Min-seog Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/474,991

(22) Filed: Sep. 2, 2014

(65) Prior Publication Data

US 2015/0130996 A1   May 14, 2015

(30) Foreign Application Priority Data

Nov. 12, 2013 (KR) ........................ 10-2013-0137110

(51) Int. Cl.
*G02B 26/02* (2006.01)
*G03B 9/02* (2006.01)
*H04N 5/238* (2006.01)
*G02B 26/00* (2006.01)
*H04N 5/235* (2006.01)

(52) U.S. Cl.
CPC ................ *G02B 26/004* (2013.01); *G03B 9/02* (2013.01); *H04N 5/238* (2013.01); *H04N 5/2354* (2013.01)

(58) Field of Classification Search
CPC ... H04N 5/2354; H04N 5/238; G02B 26/004; G03B 9/02
See application file for complete search history.

(56) References Cited

U.S. PATENT DOCUMENTS

| 7,697,187 | B2 | 4/2010 | Kato et al. |
| 2013/0016515 | A1 | 1/2013 | Chang |
| 2013/0038944 | A1* | 2/2013 | Chang et al. ................... 359/666 |
| 2014/0191107 | A1* | 7/2014 | Lee et al. .................... 250/201.1 |
| 2014/0240586 | A1* | 8/2014 | Lee et al. ....................... 348/362 |
| 2015/0130996 | A1* | 5/2015 | Chang et al. .......... G02B 26/004 |

FOREIGN PATENT DOCUMENTS

| KR | 10-2008-0029870 A | 4/2008 |
| KR | 10-2013-0009504 A | 1/2013 |

* cited by examiner

*Primary Examiner* — W B Perkey
(74) *Attorney, Agent, or Firm* — Sughrue Mion, PLLC

(57) ABSTRACT

Provided are a micro electric liquid device and an apparatus including the device. The micro electric liquid device includes a first fluid that is opaque, a second fluid that is transparent a first channel configured to have the first and second fluid flow therein without mixing, a second channel overlapped and spaced apart from the first channel, wherein the second channel is configured to have the first and second fluids flow therein, and a connection part connecting the first and second channels, wherein an aperture is adjusted by a positional change of an interface between the first and second fluids in the first and second channels, and wherein the second channel includes a first sub channel configured to have the first and second fluids flow therein and having a non-uniform height and a second sub channel configured to have the second fluid to flow therein and having a uniform height.

20 Claims, 9 Drawing Sheets

MICRO ELECTRIC LIQUID DEVICE AND APPARATUS INCLUDING THE SAME

RELATED APPLICATION

This application claims priority from Korean Patent Application No. 10-2013-0137110, filed on Nov. 12, 2013 in the Korean Intellectual Property Office, the disclosure of which is incorporated herein by reference in its entirety.

BACKGROUND

1. Technical Field

Systems, methods, and apparatuses consistent with exemplary embodiments relate to a micro electric liquid device and an apparatus including the micro electric liquid device.

2. Description of the Related Art

Techniques for adjusting or controlling light transmittance are widely used in conjunction with aperture stops, shutters of image obtaining apparatuses being operated, or pixels of image display apparatuses being operated.

Most variable aperture stops generally used in optical systems of the related art are operated by handling a plurality of metal blades, and thus are limited to reducing the sizes thereof using mechanical motions, frictions, and movable mechanical elements.

Electric-heating or static-electricity type micro electro mechanical systems (MEMSs) have been introduced for controlling light transmittance. However, such MEMSs have a non-circular aperture, gaps between blades, and a low aperture ratio of about 1% or less as compared to a total device area.

In addition, with the development of optofluidic technology combining micro-optics and microfluidics, variable aperture stops in which the aperture ratio is adjusted by deforming a polydimethylsiloxane (PDMS) membrane by air pressure have been proposed. The resolutions of variable aperture stops have been improved using three-dimensional structures and capillary force. Such aperture stops have a higher aperture ratio than MEMS aperture stops of the related art, but injection pumps are used for operating such aperture stops.

In addition, an aperture stop including a liquid lens operated by dielectric force has recently been introduced, and the aperture ratio of the aperture stop may be adjusted using electric wires disposed on the bottom of the aperture stop without using an external driving pump.

SUMMARY

One or more exemplary embodiments provide a micro electric liquid device capable of adjusting an aperture through which light passes by using an electrowetting method, and an apparatus including the micro electric liquid device.

One or more exemplary embodiments also provide a micro electric liquid device guaranteeing a maximum aperture size and an apparatus including the micro electric liquid device.

One or more exemplary embodiments also provide a micro electric liquid device capable of maintaining a maximum aperture size against an external force, and an apparatus including the micro electric liquid device.

One or more exemplary embodiments also provide a micro electric liquid device improved in the opening speed of an aperture and an apparatus including the micro electric liquid device.

According to an aspect of an exemplary embodiment, there is provided a micro electric liquid device including a first fluid that is opaque; a second fluid that is transparent; a first channel configured to have the first fluid and the second fluid to flow therein without mixing together, a second channel overlapped with the first channel and spaced apart from the first channel, wherein the second channel is configured to have the first fluid and the second fluid to flow therein, and a connection part connecting the first channel and the second channel, wherein an aperture through which light passes is adjusted by a positional change of an interface between the first fluid and the second fluid in one of the first channel and the second channel, and wherein the second channel includes a first sub channel configured to have the first and second fluids to flow therein and having a non-uniform height and a second sub channel configured to have the second fluid to flow therein and having a uniform height.

The first fluid in the second sub channel may flow to the first sub channel and stays in the first sub channel based on Laplace pressure.

The first sub channel may surround the second sub channel.

The first sub channel may have a height increasing in a direction away from the second sub channel.

The height of the first sub channel may increase linearly.

An average height of the first sub channel may be greater than a height of the second sub channel.

An average height of the first sub channel may be greater than an average height of the second sub channel.

The first fluid may flow symmetrically with respect to a center axis of the micro electric liquid device.

The connection part may include a first connection part configured to have the first fluid to flow between the first and second channels, and a second connection part configured to have the second fluid to flow between the first and second channels.

The micro electric liquid device may further include an electrode provided on an inner surface of the first channel and configured to form an electric field in the first channel in response to a voltage being applied to the electrode, wherein the positional change of the interface is caused by the electric field.

The electrode may include at least one annular electrode coated with an insulation layer.

The aperture may be largest when no electric field is formed in the first channel.

One of the first fluid and the second fluid may be a polar liquid, and the other is a nonpolar liquid or a gas.

At least a region of the first channel and the second channel may be provided with a hydrophobic surface treatment.

The first channel may be formed by a first substrate spaced apart from a second substrate facing the first substrate by a first spacer disposed between the first substrate and the second substrate, and wherein the second channel may be formed by the second substrate spaced apart from a third substrate facing the second substrate by a second spacer disposed between the second substrate and the third substrate.

The connection part may be a through-hole formed in the second substrate.

The connection part may include at least one first through-hole formed in a peripheral region of the second substrate, and at least one second through-hole formed in a center region of the second substrate.

According to an aspect of another exemplary embodiment, there is provided an image obtaining apparatus including a micro electric liquid device including a first fluid that is opaque, a second fluid that is transparent, a first channel configured to have the first fluid and the second fluid to flow therein without mixing together, a second channel overlapped with the first channel and spaced apart from the first channel, wherein the second channel is configured to have the first fluid and the second fluid to flow therein, and a connection part connecting the first channel and the second channel, wherein an aperture through which light passes is adjusted by a positional change of an interface between the first fluid and the second fluid in one of the first channel and the second channel, and wherein the second channel includes a first sub channel configured to have the first and second fluids to flow therein and having a non-uniform height and a second sub channel configured to have the second fluid to flow therein and having a uniform height, an imaging unit configured to form an image of an object by using light incident through the micro electric liquid device, and a photographing device configured to convert the image formed by the imaging unit into an electric signal.

According to an aspect of another exemplary embodiment, there is provided an image display apparatus including a light source providing light, and a display panel including a plurality of arrayed micro electric liquid devices, wherein at least one of the plurality of arrayed micro electric liquid devices includes a first fluid that is opaque, a second fluid that is transparent, a first channel configured to have the first fluid and the second fluid to flow therein without mixing together, a second channel overlapped with the first channel and spaced apart from the first channel, wherein the second channel is configured to have the first fluid and the second fluid to flow therein, and a connection part connecting the first channel and the second channel, wherein an aperture through which light passes is adjusted by a positional change of an interface between the first fluid and the second fluid in one of the first channel and the second channel, and wherein the second channel includes a first sub channel configured to have the first and second fluids to flow therein and having a non-uniform height and a second sub channel configured to have the second fluid to flow therein and having a uniform height, wherein the display panel is configured to transmit light provided by the light source while adjusting light transmittance thereof according to image information.

A first fluid of the at least one of the plurality of arrayed micro electric liquid devices may have a color.

According to an aspect of another exemplary embodiment, there is provided a micro electric liquid device that includes a transparent upper substrate including a first portion of an electrode, a transparent middle substrate including a second portion of the electrode, a middle passage, and an edge passage, a transparent lower substrate, an upper spacer configured to be placed between the transparent upper substrate and the transparent middle substrate along an outer perimeter providing a first channel, a lower spacer configured to be placed between the transparent middle substrate and the transparent lower substrate along the outer perimeter providing a second channel, wherein the second channel height increases toward the perimeter, wherein the middle passage and edge passage provide openings between the first channel and the second channel, an opaque fluid that resides in outer regions of the first channel and the second channel and is configured to move through the edge passage and a transparent fluid that resides in inner regions of the first channel and the second channel and is configured to move through the middle passage, wherein the opaque fluid and the transparent fluid do not mix, and wherein a voltage across the electrode causes the opaque fluid and transparent fluid to move.

BRIEF DESCRIPTION OF THE DRAWINGS

The and/or other aspects will become more apparent and readily appreciated from the following description of exemplary embodiments, taken in conjunction with the accompanying drawings in which.

DETAILED DESCRIPTION

Figure 1:
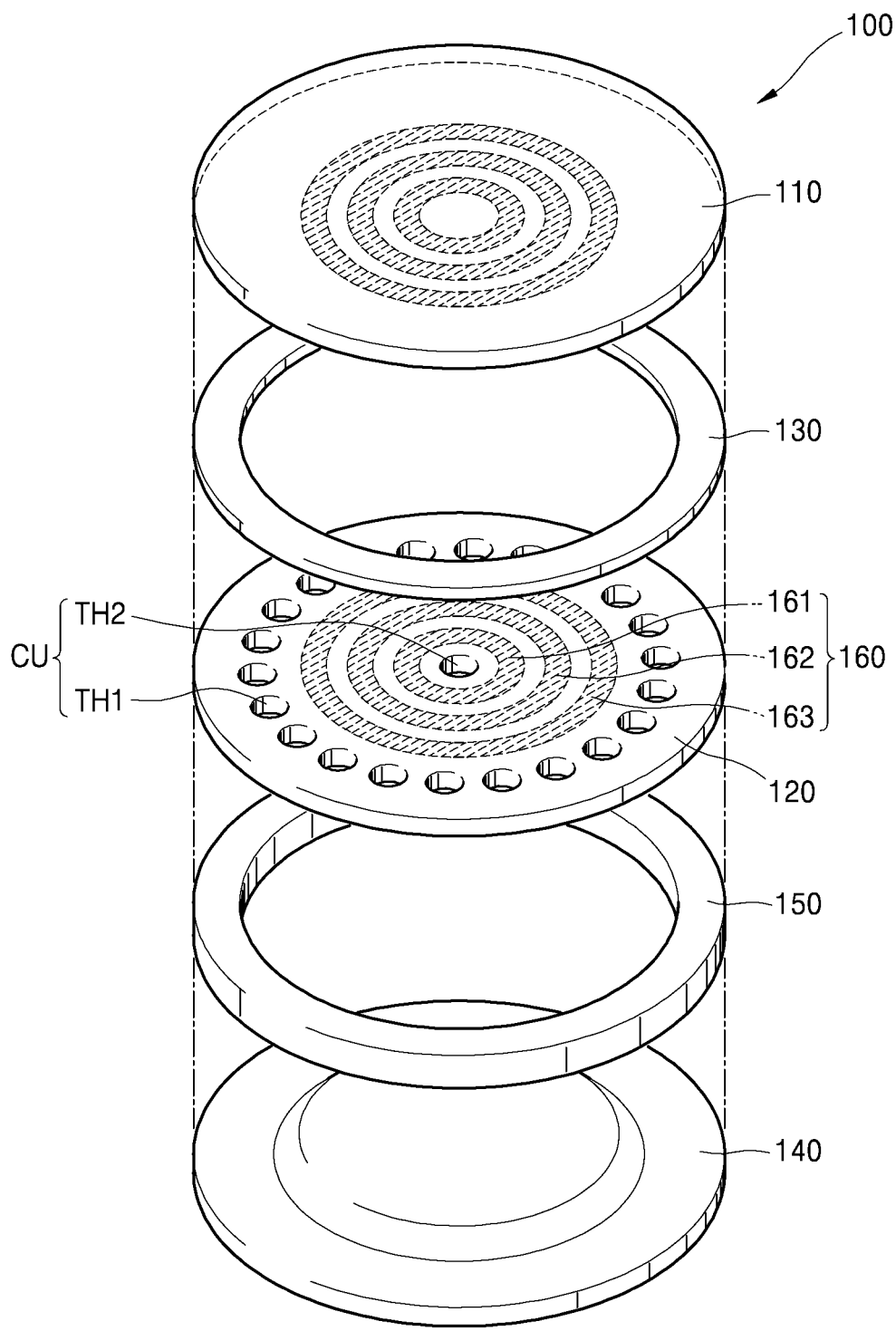
FIG. 1 is a schematic exploded perspective view illustrating a micro electric liquid device according to an exemplary embodiment.

Reference will now be made in detail to exemplary embodiments, examples of which are illustrated in the accompanying drawings, wherein like reference numerals refer to like elements throughout and the size of each element may be exaggerated for clarity. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 2A:
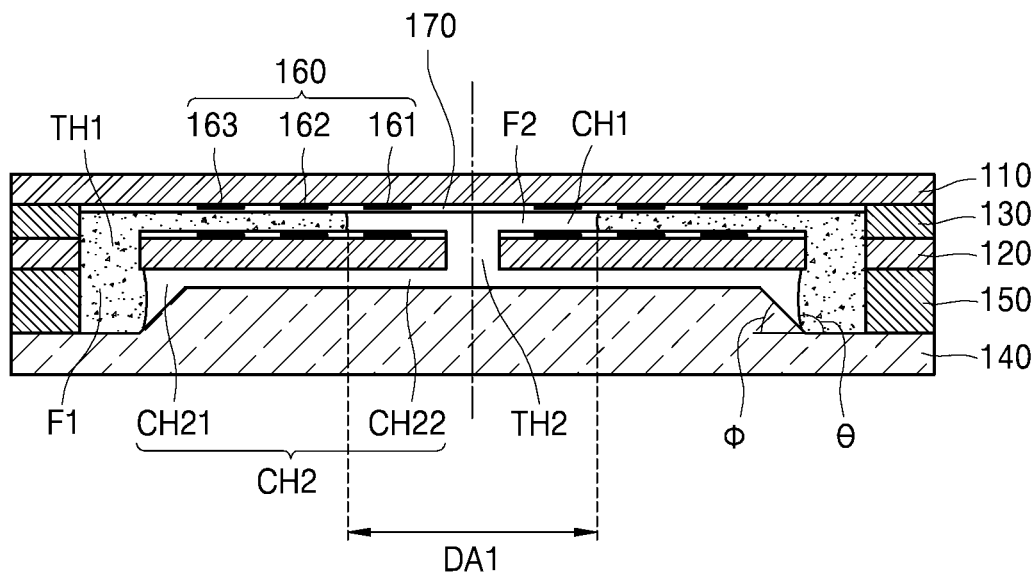
FIGS. 2A and 2B are schematic cross-sectional views illustrating a micro electric liquid device, similar to that depicted in FIG. 1, according to one or more exemplary embodiments.
Figure 2B:
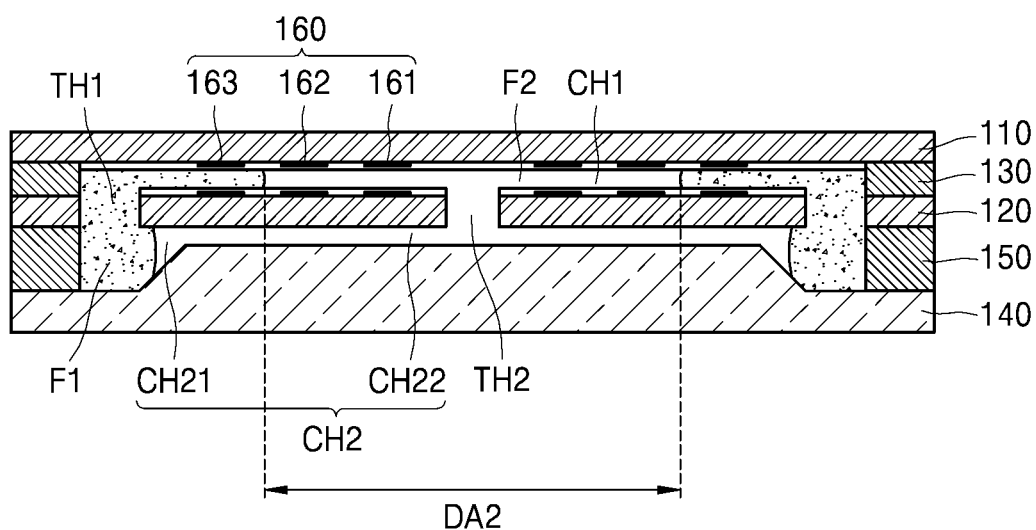

FIG. 1 is a schematic exploded perspective view illustrating a micro electric liquid device 100 according to an exemplary embodiment, and FIGS. 2A and 2B are schematic cross-sectional views illustrating a micro electric liquid device, similar to the micro electric liquid device 100 depicted in FIG. 1, in which apertures having different sizes are formed. In the perspective view of FIG. 1, some elements are not illustrated for clarity.

Referring to FIGS. 1 to 2B, the micro electric liquid device 100 includes: a first channel CH1 allowing a first fluid F1 and a second fluid F2 to flow therein without mixing together, the first fluid F1 being opaque, the first fluid F2 being transparent; a second channel CH2 overlapped with the first channel CH1 and spaced apart from the first channel CH1, the second channel CH2 allowing the first and second fluids F1 and F2 to flow therein; and a connection part CU connecting the first and second channels CH1 and CH2. An aperture through which light passes may be adjusted by a positional change of an interface between the first and second fluids F1 and F2 in one of the first and second channels CH1 and CH2.

One of the first and second fluids F1 and F2 may be a polar fluid, and the other may be a nonpolar fluid. In detail, the first fluid F1 may be a fluid such as a liquid metal or a polar liquid capable of blocking or absorbing light. For example, the first fluid F1 may be a liquid metal such as mercury (Hg) or a liquid in which a dye may be dissolved to enable the liquid to have a light absorption wavelength range. For example, the dye may be carbon black absorbing visible light, a dye absorbing near infrared rays and having a maximum light absorption wavelength of about 968 nm, or a dye absorbing near infrared rays and having a maximum light absorption wavelength of about 1054 nm. The second fluid F2 may be a transparent fluid that does not mix with the first fluid F1. For example, the second fluid F2 may be a gas or a nonpolar liquid.

The first fluid F1 may be disposed in edge regions of the first and second channels CH1 and CH2, and the second fluid F2 may be disposed in center regions of the first and second channels CH1 and CH2. In addition, the first and second fluids F1 and F2 may flow symmetrically with respect to a center axis CA of the micro electric liquid device 100.

The first channel CH1 may be formed by a first substrate 110, a second substrate 120 facing the first substrate 110 and spaced apart from the first substrate 110, and a first spacer 130 disposed between the first substrate 110 and the second substrate 120. The second channel CH2 may be formed by the second substrate 120, a third substrate 140 facing the second substrate 120, and spaced apart from the second substrate 120, and a second spacer 150 disposed between the second substrate 120 and the third substrate 140. The first substrate 110, the second substrate 120, and the third substrate 140 may be formed of a transparent material such as glass or a transparent plastic material. The first and second spacers 130 and 150 may be formed of an opaque material, or may be formed of glass or a plastic material coated with an opaque material.

The connection part CU may include through-holes TH1 and TH2 formed in the second substrate 120. For example, the connection part CU may include at least one first through-hole TH1 in a peripheral region of the second substrate 120 and at least one second through-hole TH2 in a center region of the second substrate 120. The first fluid F1 may flow between the first and second channels CH1 and CH2 through the first through-hole TH1, and the second fluid F2 may flow through the first and second channels CH1 and CH2 through the second through-hole TH2.

The first channel CH1 may have a uniform height (h1). The second channel CH2 may include: a first sub channel CH21 having a non-uniform height (h2) and allowing the first and second fluids F1 and F2 to flow therein; and a second sub channel CH22 having a uniform height (h3) and allowing the second fluid F2 to flow therein. The first sub channel CH21 may be disposed in the edge region of the second channel CH2, and the second sub channel CH22 may be disposed in the center region of the second channel CH2. For example, the first sub channel CH21 may surround the second sub channel CH22. The height (h2) of the first sub channel CH21 may increase in a direction away from the second sub channel CH22. For example, the height (h2) of the first sub channel CH21 may increase linearly. In addition, the height (h2) of the first sub channel CH21 may be equal to the height (h3) of the second sub channel CH22 at an interface with the second sub channel CH22 and may be maximal at an interface with the second spacer 150.

In addition, the first sub channel CH21 may have an average height greater than an average height of the first channel CH1 and the height (h3) of the second sub channel CH22. Although the first fluid F1 flows from the first channel CH1 to the second channel CH2, the first fluid F1 may be confined in the first sub channel CH21 of the second channel CH2.

At least a region of the first and second channels CH1 and CH2 may be processed such that each has a hydrophobic surface treatment. For example, the first substrate 110, the second substrate 120, and the third substrate 140 may be surface-treated.

An electrode 160 may be provided on an inner surface of the first channel CH1 to form an electric field in the first channel CH1 when a voltage is applied to the electrode 160. The electrode 160 may include at least one electrode pair 161, 162, or 163 for digital control of the aperture.

For example, the electrode 160 may include a plurality of electrode pairs 161, 162, and 163 having concentric annular shapes and different radii. However, the shapes and number of the electrode pairs 161, 162, and 163 of the electrode 160 are not limited to those illustrated in FIGS. 1 to 2B but may be varied.

Electrodes of the electrode 160 may be formed of a transparent conductive material, and examples of the transparent conductive material include: metal oxides such as indium tin oxide (ITO) and indium zinc oxide (IZO); films in which nanoparticles of metals such as gold (Au) and gold (Au) are dispersed; carbon nanostructures such as carbon nanotubes (CNTs) and graphene; and conductive polymers such as poly (3,4-ethylenedioxythiophene) (PEDOT), polypyrrole(PPy), and poly(3-hexylthiophene) (P3HT). In addition, an insulation layer formed on the electrode 160 may be provided by a hydrophobic surface treatment.

The micro electric liquid device 100 according to an exemplary embodiment may be operated by electrowetting and may be stopped by the balance of Laplace pressure. Electrowetting is a phenomenon where the contact angle of a polar fluid placed on an electrode coated with an insulation material may be varied according to a voltage applied thereto. For example, the angles of contact on a three-phase contact line (TCL) at which a nonpolar fluid, a polar fluid, and an insulation material meet are varied according to interfacial tension. The use of electrowetting may allow rapid and efficient controlling of fluid flows and reversible moving and controlling of fluids.

If a voltage is applied to any pair of the electrode pairs 161, 162, and 163 of the electrode 160, the electrode pair (for example, the electrode pair 162 shown in FIG. 2A) may be activated as a driving electrode pair, and electromechanical forces are applied to TCLs formed on the electrode pair 162 at which the first fluid F1, the second fluid F2, and insulation layers 170 meet, to move the first fluid F1 toward the center region of the first channel CH1 and thus to narrow the aperture. Then, the movements of the first and second fluids F1 and F2 are stopped when the Laplace pressure is balanced, and the diameter of the aperture becomes DA1.

In addition, as shown in FIG. 2B, if the voltage is not applied to the electrode pair 162, the first fluid F1 may be moved to the edge region of the first channel CH1, and thus the aperture may be enlarged. Then, movements of the first and second fluids F1 and F2 are stopped when the Laplace pressure is balanced, and the diameter of the aperture becomes DA2.

Figure 3A:
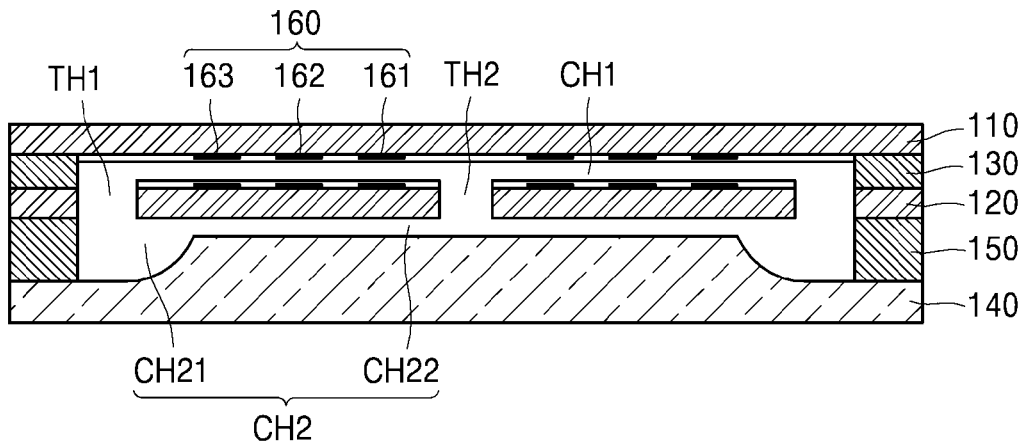
FIGS. 3A to 3C are views illustrating modification examples of a second channel applicable to a micro electric liquid device, similar to that depicted in FIG. 1, according to one or more exemplary embodiments.
Figure 3B:
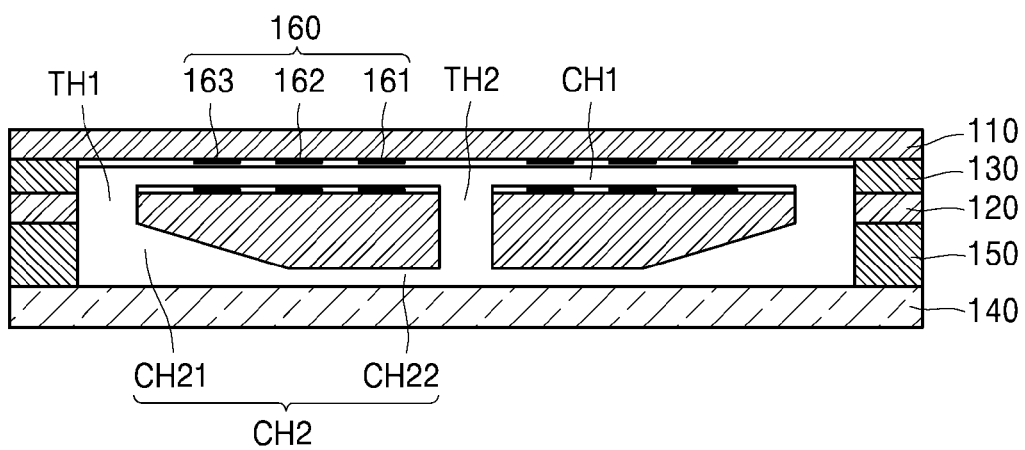
Figure 3C:
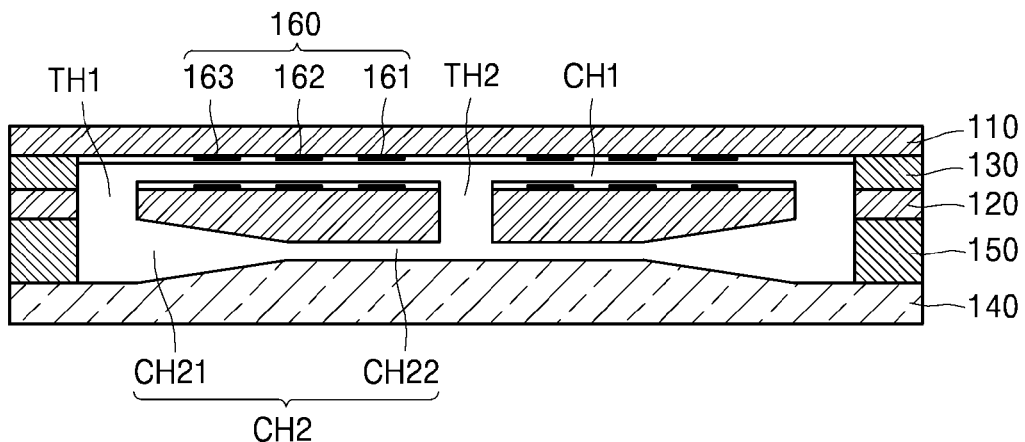

FIGS. 3A to 3C are views illustrating modification examples of a second channel CH2 for a micro electric liquid device, similar to the micro electric liquid device 100 depicted in FIG. 1.

Referring to FIG. 3A, the height (h2) of the first sub channel CH21 may nonlinearly increase in a direction away from the second sub channel CH22. Although the height (h2) of the first sub channel CH21 increases nonlinearly, the height (h2) of the first sub channel CH21 may increase without an inflection point. The height (h2) of the first sub channel CH21 may be adjusted by varying the width of the third substrate 140. In addition, the height (h2) of the first sub channel CH21 may be adjusted by varying the width of the second substrate 120. Referring to FIG. 3B, the width of the second substrate 120 may be constant in a center region and may be decreased in a peripheral region to increase the height (h2) of the first sub channel CH21 in the peripheral region. Referring to FIG. 3C, the first sub channel CH21 may be formed by varying the widths of the second and third substrates 120 and 140.

Figure 4A:
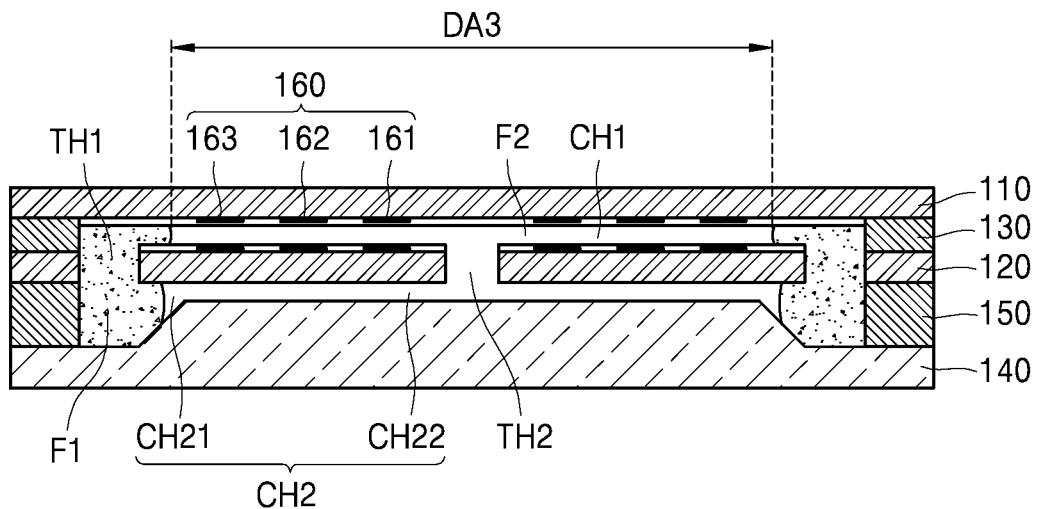
FIG. 4A is a cross-sectional view illustrating a micro electric liquid device, similar to that depicted in FIG. 1, when an aperture thereof is maximal according to an exemplary embodiment.
Figure 4B:
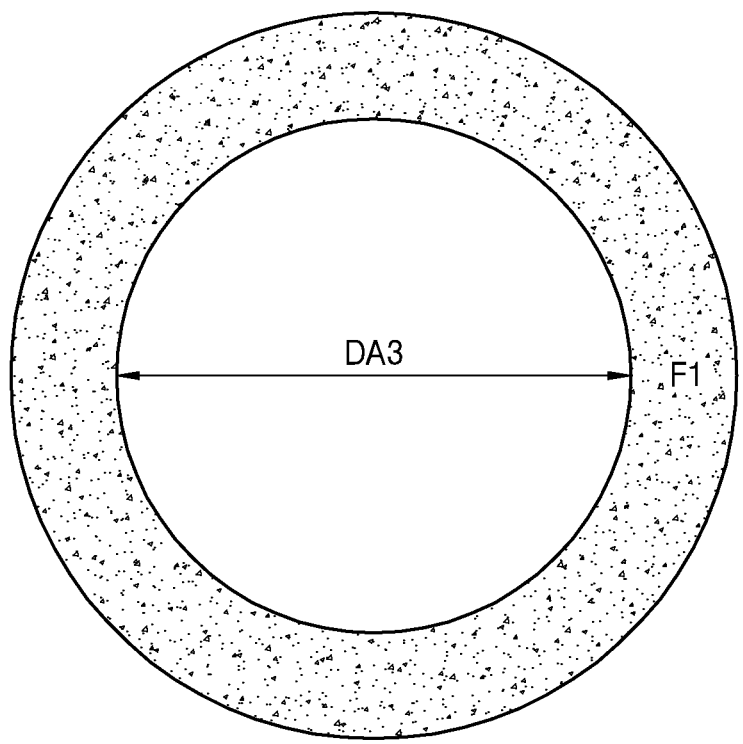
FIG. 4B is a plan view illustrating a first fluid in a micro electric liquid device of FIG. 4A according to an exemplary embodiment.
Figure 5:
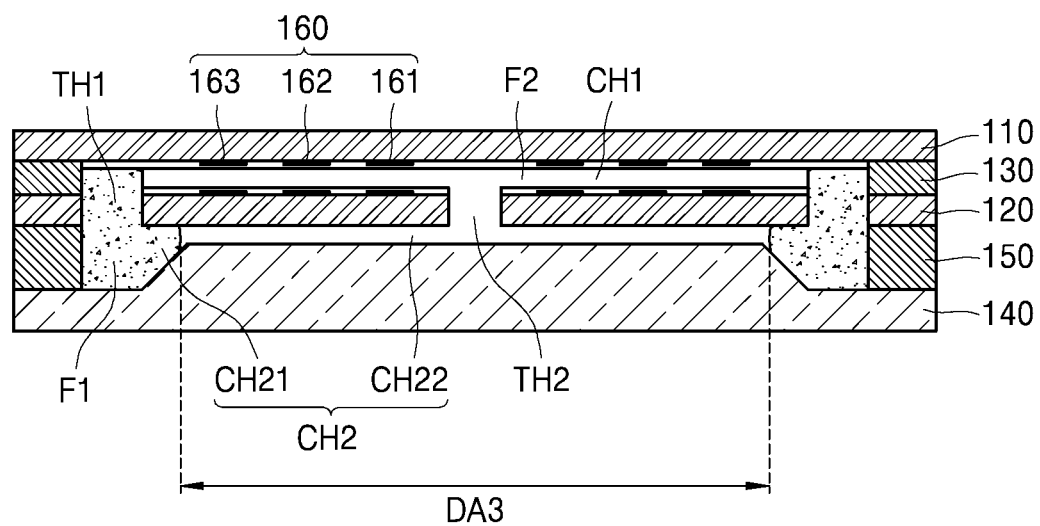
FIG. 5 is a cross-sectional view illustrating a micro electric liquid device according to an exemplary embodiment.

If no voltage is applied to the electrode 160, interfaces (I1) and (I2) between the first and second fluids F1 and F2 are determined by the Laplace pressure. That is, if no voltage is applied to the electrode 160, the first and second fluids F1 and F2 move to positions where the Laplace pressure may be balanced. The pressure difference ΔP (Laplace pressure) between the first and second fluids F1 and F2 at an interface between the first and second fluids F1 and F2 may be approximately expressed by Equation 1 below.

$$\Delta P = \gamma \left( \frac{2\cos\theta}{h} + \frac{1}{r} \right)$$ [Equation 1]

where γ, θ, h, and r refer to the interfacial tension between the first and second fluids F1 and F2, the contact angle of a polar fluid (that is, the first fluid F1) with respect to a channel surface, the height of a channel, and the radius of an aperture defined by the first fluid F1, respectively. If the radius (r) of the aperture is very large as compared with the height (h) of the channel, the radius (r) have no significant effect on the pressure difference ΔP. When the Laplace pressure may be balanced, the first and second fluids F1 and F2 may stop. At a position where the first and second fluids F1 and F2 stop, the aperture may be maximal. That is, the maximum size of the aperture may be determined by an interface (I1) in the first channel CH1 or an interface (I2) in the second channel CH2. FIG. 4A is a cross-sectional view illustrating a micro electric liquid device, similar to the micro electric liquid device 100 depicted in FIGS. 1, 2A, and 2B, when the aperture thereof is maximal, and FIG. 4B is a plan view illustrating the first fluid F1 in the micro electric liquid device 100 of FIG. 4A. Referring to FIG. 4A, the maximum size of the aperture may be determined by an interface (I1) in the first fluid F1. However, the maximum size of the aperture is not limited thereto. FIG. 5 is a cross-sectional view illustrating the micro electric liquid device 100 according to another exemplary embodiment. Referring to FIG. 5, the maximum size of the aperture may be determined by an interface (I2) in the second channel CH2.

When the micro electric liquid device 100 is manufactured, the height (h1) of the first channel CH1, the height (h2) of the first sub channel CH21, and the slope of the first sub channel CH21 may be adjusted so that the interface (I2) between the first and second fluids F1 and F2 may be formed in the first sub channel CH21. The slope of the first sub channel CH21 may be a factor increasing the contact angle θ of the first fluid F1. Therefore, the contact angle θ may be greater when the interface (I2) between the first and second fluids F1 and F2 may be formed in the first sub channel CH21, rather than when the interface (I2) between the first and second fluids F1 and F2 may be formed in the second sub channel CH22. The interface (I2) between the first and second fluids F1 and F2 that may be formed in the first sub channel CH21 by the balance of Laplace pressure.

As described above, if the micro electric liquid device 100 is designed so that the first fluid F1 is disposed in the first sub channel CH21 when no voltage is applied to the electrode 160, the maximum size and shape of the aperture may be constantly maintained regardless of an external force.

Figure 6A:
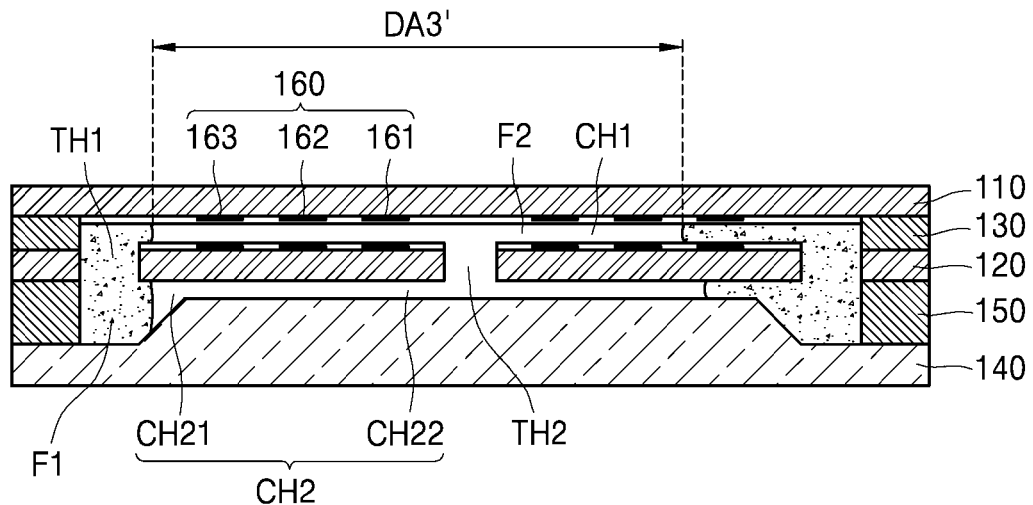
FIG. 6A is a cross-sectional view illustrating a micro electric liquid device when the position of an interface is changed by an external force according to an exemplary embodiment.
Figure 6B:
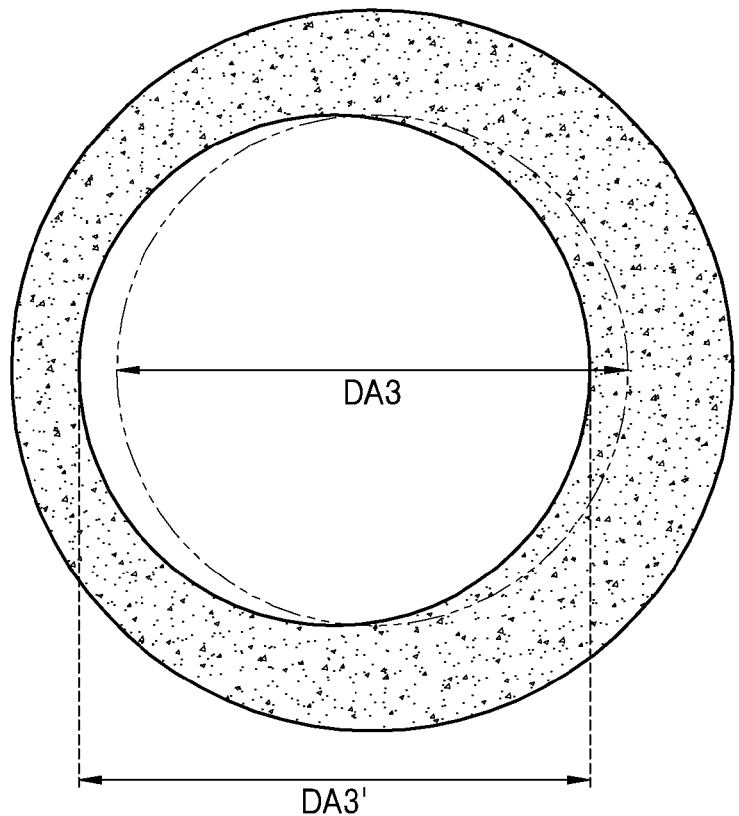
FIG. 6B is a view illustrating a first fluid when a position of an interface thereof is changed by an external force according to an exemplary embodiment.

For example, the positions of the interfaces (I1) and (I2) may be varied by an external force even though no voltage is applied to the electrode 160. FIG. 6A is a cross-sectional view illustrating the micro electric liquid device 100 when the interfaces (I1) and (I2) are varied by an external force, and FIG. 6B is a view illustrating the first fluid F1 in the case. Herein, an external force may be gravity or an impactive force applied from the outside. As shown in FIGS. 6A and 6B, the aperture, that is, the first fluid F1 may not maintain an axially symmetric ring shape due to an external force. If the first fluid F1 does not maintain an axially symmetric ring shape, a portion of the aperture may be blocked when the micro electric liquid device 100 is used as an aperture stop. Particularly, if the heights of the first and second channels CH1 and CH2 are constant, the Laplace pressure may be balanced even though the positions of the (first and second) interfaces (I1) and (I2) are changed. In this case, the first and second interfaces (I1) and (I2) may stay at the changed positions. That is, it may be difficult to form an axially symmetric aperture.

However, in the micro electric liquid device 100 according to one or more exemplary embodiments, although the aperture is varied (DA3') by an external force, the aperture may return to an original shape thereof (DA3). Specifically, the positions of the first and second interfaces (I1) and (I2) may be varied by an external force. For example, a portion (I2)1 of the second interface (I2) may be formed in the first sub channel CH21, and the other portion (I2)2 of the second interface (I2) may be formed in the second sub channel CH22. The height (h3) of the second sub channel CH22 may be smaller than the height (h2) of the first sub channel CH21, and the contact angle θ of the first fluid F1 in the second sub channel CH22 may be smaller than that of the first fluid F1 in the first sub channel CH21. Therefore, the first fluid F1 disposed in the second sub channel CH22 may flow to the first sub channel CH21, and the first fluid F1 disposed in the first sub channel CH21 may flow to the second sub channel CH22. Thus, the aperture may return to an original shape thereof (DA3) in which the Laplace pressure may be balanced.

As described above, because the first sub channel CH21 of the micro electric liquid device 100 of the exemplary embodiments has a non-uniform height (h2), although the first fluid F1 may be temporarily moved into the second sub channel CH22 by an external force, the first fluid F1 may move back to the first sub channel CH21 by the balance of Laplace pressure, and thus the (maximum) shape (DA3) of the aperture may be maintained. In addition, although the first fluid F1 is imbalanced in the first sub channel CH21 by an external force, the first fluid F1 may return to a balanced shape in which the contact angle θ thereof may be the same in a whole region of the first fluid F1.

Figure 7:
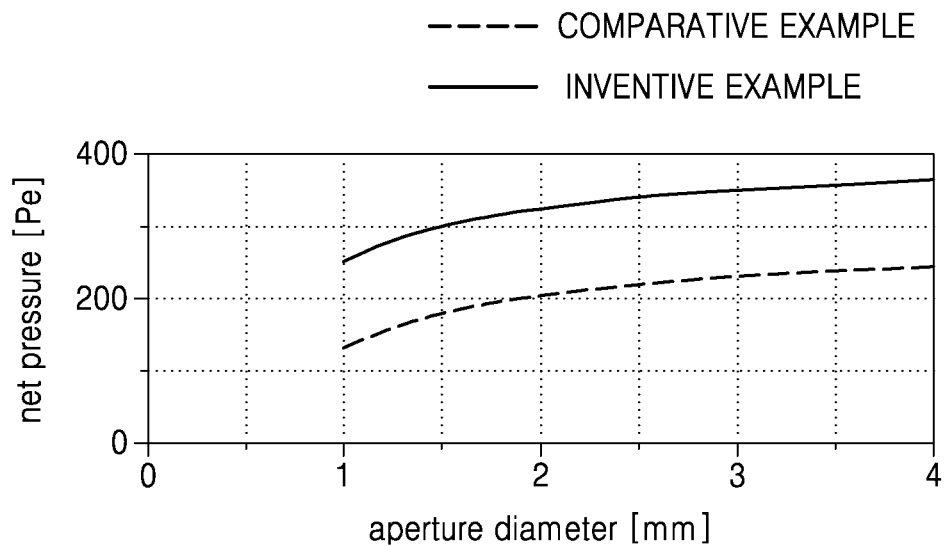
FIG. 7 shows simulation results on a relationship between a pressure difference and an aperture of a micro electric liquid device according to an exemplary embodiment.

The micro electric liquid device 100 may improve in the opening and closing speed of the aperture. FIG. 7 shows simulation results on a relationship between a pressure difference and an aperture of the micro electric liquid device 100. In the simulation, the height of a second channel of a comparative example was uniform, and the height of a second channel of the comparative example was set to be equal to the maximum height of the second channel CH2 in an exemplary embodiment. In the graph shown in FIG. 7, the horizontal axis refers to the position of an interface of a first fluid, and the vertical axis refers to the pressure difference ΔP between first and second fluids in a second channel.

Referring to the graph, when an aperture is opened, the pressure difference ΔP may be greater in the exemplary embodiment, noted as an inventive example, than in the comparative example. Because the pressure difference is linearly proportional to the operational speed of the micro electric liquid device 100, the micro electric liquid device 100 of the exemplary embodiments may have a fast opening speed when being used as an aperture stop.

Figure 8:
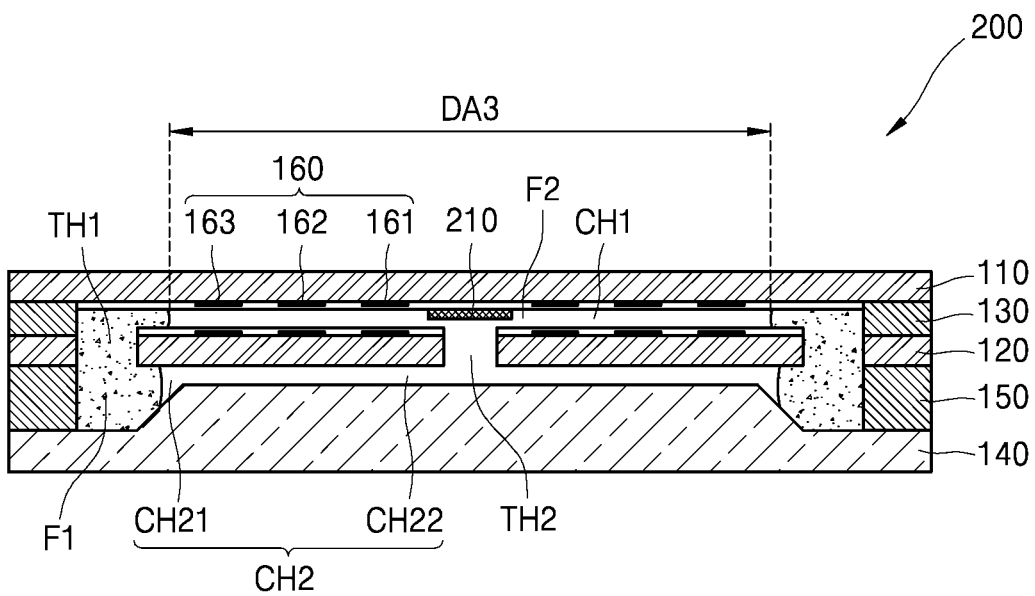
FIG. 8 is a schematic exploded perspective view illustrating a micro electric liquid device according to an exemplary embodiment.

FIG. 8 is a schematic exploded perspective view illustrating the structure of a micro electric liquid device 200 according to another exemplary embodiment.

The micro electric liquid device 200 of the current exemplary embodiment is different from the micro electric liquid device 100 in that the micro electric liquid device 200 may function as a shutter capable of completely closing an aperture AD. An opaque pattern part 210 may be further disposed in an center region of a first substrate 110 to block light transmitted through first and second channels CH1 and CH2. The opaque pattern part 210 may have a size corresponding to the minimum size of the aperture (AD) determined by flows of first and second fluids F1 and F2. That is, when the size of the aperture (AD) becomes minimal by flow of the first fluid F1, light passing through the aperture (AD) may be blocked by the opaque pattern part 210.

Figure 9:
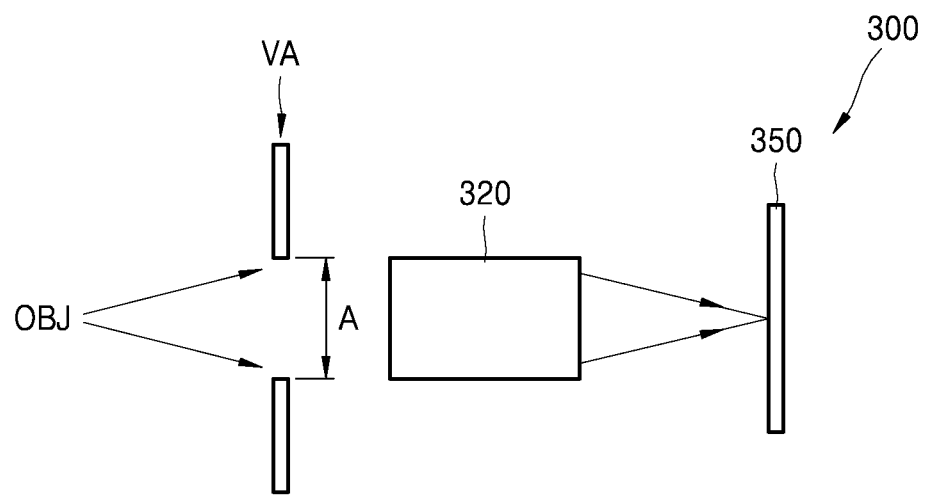
FIG. 9 is a schematic view illustrating an image obtaining apparatus according to an exemplary embodiment.

The micro electric liquid devices 100 and 200 may be used as variable aperture stops or pixel shutters in an image obtaining apparatus or an image display apparatus. FIG. 9 is a schematic view illustrating the structure of an image obtaining apparatus 300 according to an exemplary embodiment.

The image obtaining apparatus 300 includes a variable aperture VA to adjust the size of an aperture (AD) when light is incident from an object OBJ, an imaging unit 320 to form an image of the object OBJ using light incident through the variable aperture VA, and a photographing device 350 to convert an image formed by the imaging unit 320 into an electric signal.

The variable aperture VA may include the above-described micro electric liquid device, and the imaging unit 320 may include at least one lens. The photographing device 350 may include a charge coupled device (CCD) or a complementary metal oxide semiconductor (CMOS) device.

The variable aperture VA has a microelectrofluidic structure and a fast micro operational speed. Thus, the apparatus 300 including the variable aperture VA may be used as a medical image apparatus such as an optical coherence tomography (OCT) apparatus and a microscope.

Figure 10:
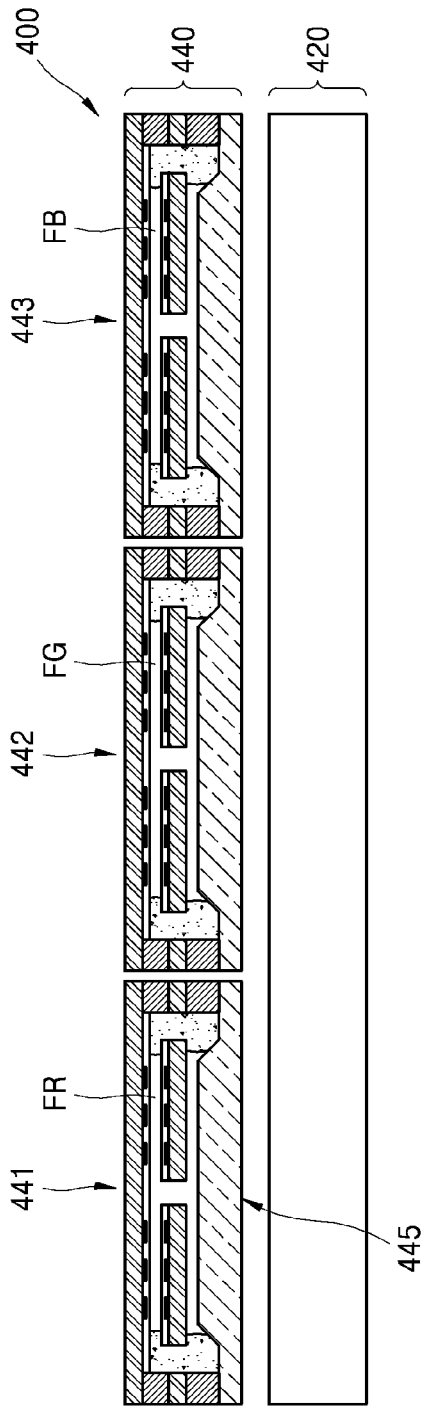
FIG. 10 is a schematic view illustrating an image display apparatus according to an exemplary embodiment.

FIG. 10 is a schematic view illustrating an image display apparatus 400 according to an exemplary embodiment.

The image display apparatus 400 includes a light source 420 providing light for forming images, and a display panel 440 transmitting light provided by the light source 420 while adjusting light transmittance thereof according to image information.

The display panel 440 may include a plurality of arrayed micro electric liquid devices such as the above-described micro electric liquid device 100. For example, the display panel 440 may include a first device 441, a second device 442, and a third device 443. The first device 441 may be the same structure of the micro electric liquid device 100 and include a transparent fluid FR having a first color. The second device 442 may have the same structure as the micro electric liquid device 100 and include a transparent fluid FG having a second color. The third device 443 may have the same structure as the micro electric liquid device 100 and include a transparent fluid FB having a third color. The first, second, and third colors may be red, green, and blue, respectively. Each of the first device 441, the second device 442, and the third device 443 may transmit or block light incident from the light source 420 as an electrode is controlled according to image information and may be adjusted in the size of an aperture (AD) for displaying gradations of color in transmission mode.

Figure 11:
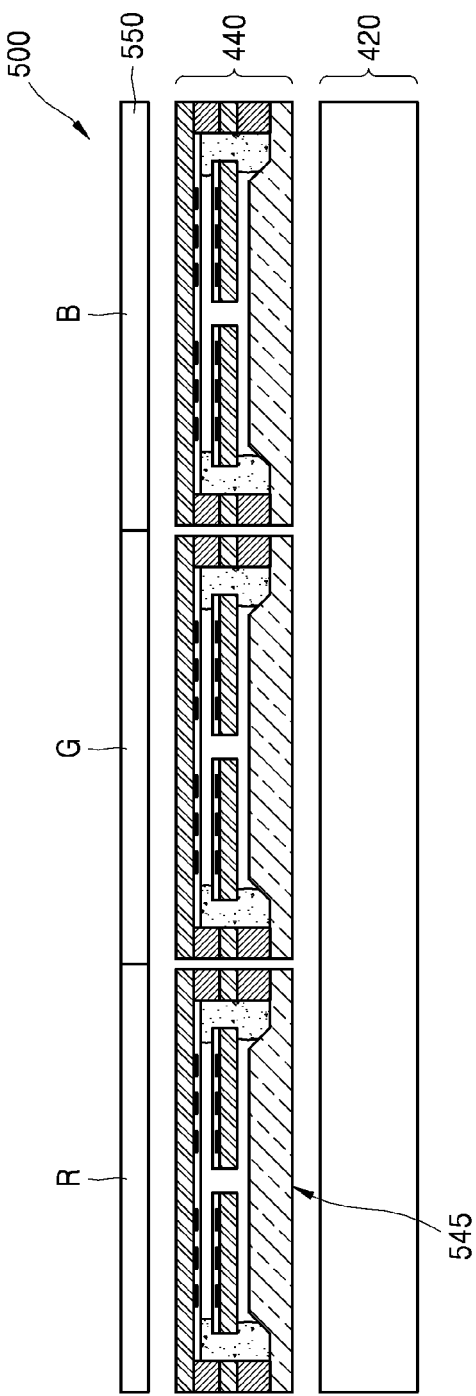
FIG. 11 is a schematic view illustrating an image display apparatus according to an exemplary embodiment.

FIG. 11 is a schematic view illustrating an image display apparatus 500 according to another exemplary embodiment.

The image display apparatus 500 may include a light source 520 providing light for forming images, and a display panel 540 transmitting light provided by the light source 520 while adjusting light transmittance thereof according to image information. The display panel 540 may include a plurality of arrayed micro electric liquid devices 545. The micro electric liquid devices 545 may have the same structure as the above-described micro electric liquid device 100. The image display apparatus 500 of the current exemplary embodiment may include a color filter 550. The image display apparatus 500 is different from the image display apparatus 400 illustrated in FIG. 10. For example, in the image display apparatus 500, the color filter 550 having color regions R, G, and B respectively corresponding to the micro electric liquid devices 545 is disposed above the display panel 540.

Each of the micro electric liquid devices 545 may transmit or block light incident from the light source 520 as an electrode 160 may be controlled according to image information. Furthermore, in transmission mode, each of the micro electric liquid devices 545 may be adjusted in the size of an aperture (AD) to control the amount of light incident on the color regions R, G, and B of the color filter 550 and thus to display gradations of color.

According to one or more of the exemplary embodiments, the micro electric liquid device may be simple and small. In addition, according to one or more of the exemplary embodiments, the micro electric liquid device and the apparatus including the micro electric liquid device may maintain the maximum aperture size although an external force is applied thereto. Furthermore, according to one or more of the exemplary embodiments, the micro electric liquid device and the apparatus including the micro electric liquid device may have an improved aperture opening speed.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A micro electric liquid device comprising:
   a first fluid that is opaque;
   a second fluid that is transparent;
   a first channel configured to have the first fluid and the second fluid to flow therein without mixing together;
   a second channel overlapped with the first channel and spaced apart from the first channel, wherein the second channel is configured to have the first fluid and the second fluid to flow therein; and a connection part connecting the first channel and the second channel, wherein an aperture through which light passes is adjusted by a positional change of an interface between the first fluid and the second fluid in one of the first channel and the second channel, and wherein the second channel comprises a first sub channel configured to have the first and second fluids to flow therein and having a non-uniform height and a second sub channel configured to have the second fluid to flow therein and having a uniform height.

2. The micro electric liquid device of claim 1, wherein the first fluid in the second sub channel flows to the first sub channel and stays in the first sub channel based on Laplace pressure.

3. The micro electric liquid device of claim 1, wherein the first sub channel surrounds the second sub channel.

4. The micro electric liquid device of claim 1, wherein the first sub channel has a height increasing in a direction away from the second sub channel.

5. The micro electric liquid device of claim 4, wherein the height of the first sub channel increases linearly.

6. The micro electric liquid device of claim 1, wherein an average height of the first sub channel is greater than a height of the second sub channel.

7. The micro electric liquid device of claim 1, wherein an average height of the first sub channel is greater than an average height of the second sub channel.

8. The micro electric liquid device of claim 1, wherein the first fluid flows symmetrically with respect to a center axis of the micro electric liquid device.

9. The micro electric liquid device of claim 1, wherein the connection part comprises:
   a first connection part configured to have the first fluid to flow therein between the first and second channels; and
   a second connection part configured to have the second fluid to flow therein between the first and second channels.

10. The micro electric liquid device of claim 1, further comprising:
    an electrode provided on an inner surface of the first channel and configured to form an electric field in the first channel in response to a voltage being applied thereto,
    wherein the positional change of the interface is caused by the electric field.

11. The micro electric liquid device of claim 10, wherein the electrode comprises at least one annular electrode coated with an insulation layer.

12. The micro electric liquid device of claim 1, wherein the aperture is largest when no electric field is formed in the first channel.

13. The micro electric liquid device of claim 1, wherein one of the first fluid and the second fluid is a polar liquid, and the other is a nonpolar liquid or a gas.

14. The micro electric liquid device of claim 1, wherein at least a region of the first channel and the second channel is provided with a hydrophobic surface treatment.

15. The micro electric liquid device of claim 1,
    wherein the first channel is formed by a first substrate spaced apart from a second substrate facing the first substrate by a first spacer disposed between the first substrate and the second substrate, and
    wherein the second channel is formed by the second substrate spaced apart from a third substrate facing the second substrate by a second spacer disposed between the second substrate and the third substrate.

16. The micro electric liquid device of claim 15, wherein the connection part is a through-hole formed in the second substrate.

17. The micro electric liquid device of claim 15, wherein the connection part comprises:
    at least one first through-hole formed in a peripheral region of the second substrate; and
    at least one second through-hole formed in a center region of the second substrate.

18. An image obtaining apparatus comprising:
    a micro electric liquid device comprising:
       a first fluid that is opaque;
       a second fluid that is transparent;
       a first channel configured to have the first fluid and the second fluid to flow therein without mixing together;
       a second channel overlapped with the first channel and spaced apart from the first channel, wherein the second channel is configured to have the first fluid and the second fluid to flow therein; and
       a connection part connecting the first channel and the second channel,
       wherein an aperture through which light passes is adjusted by a positional change of an interface between the first fluid and the second fluid in one of the first channel and the second channel, and
       wherein the second channel comprises a first sub channel configured to have the first and second fluids to flow therein and having a non-uniform height and a second sub channel configured to have the second fluid to flow therein and having a uniform height;
    an imaging unit configured to form an image of an object by using light incident through the micro electric liquid device; and
    a photographing device configured to convert the image formed by the imaging unit into an electric signal.

19. An image display apparatus comprising:
    a light source providing light; and
    a display panel comprising a plurality of arrayed micro electric liquid devices, wherein at least one of the plurality of arrayed micro electric liquid devices comprises:
       a first fluid that is opaque;
       a second fluid that is transparent;
       a first channel configured to have the first fluid and the second fluid to flow therein without mixing together;
       a second channel overlapped with the first channel and spaced apart from the first channel, wherein the second channel is configured to have the first fluid and the second fluid to flow therein; and
       a connection part connecting the first channel and the second channel,
       wherein an aperture through which light passes is adjusted by a positional change of an interface between the first fluid and the second fluid in one of the first channel and the second channel, and
       wherein the second channel comprises a first sub channel configure to have the first and second fluids to flow therein and having a non-uniform height and a second sub channel configured to have the second fluid to flow therein and having a uniform height,
    wherein the display panel is configured to transmit light provided by the light source while adjusting light transmittance thereof according to image information.

20. The image display apparatus of claim 19, wherein a first fluid of the at least one of the plurality of arrayed micro electric liquid devices has a color.

\* \* \* \* \*